United States Patent [19]

Jarvenkyla et al.

[11] Patent Number: 5,340,299
[45] Date of Patent: Aug. 23, 1994

[54] APPARATUS FOR MANUFACTURING RIBBED PIPES

[75] Inventors: Jyri Jarvenkyla, Salpakangas, Finland; Eino Holso, Viskafors, Sweden

[73] Assignee: Uponor, N.V., Philipsburg, Netherlands Antilles

[21] Appl. No.: 778,171

[22] PCT Filed: Jul. 5, 1990

[86] PCT No.: PCT/FI90/00178
§ 371 Date: Mar. 12, 1992
§ 102(e) Date: Mar. 12, 1992

[87] PCT Pub. No.: WO91/00797
PCT Pub. Date: Jan. 24, 1991

[30] Foreign Application Priority Data

Jul. 12, 1989 [FI] Finland .................. 893383

[51] Int. Cl.$^5$ .................. B29C 47/86
[52] U.S. Cl. .................. 425/326.1; 264/209.3; 264/508; 425/336; 425/380; 425/384; 425/393; 425/396
[58] Field of Search .................. 425/325, 369, 326.1, 425/335, 336, 370, 380, 384, 393, 133.1, 467, 396; 264/508, 515, 209.3

[56] References Cited

U.S. PATENT DOCUMENTS

| | | | |
|---|---|---|---|
| 3,914,366 | 10/1975 | Wilson | 425/380 |
| 3,998,579 | 12/1976 | Nordstrom | 425/393 |
| 4,314,958 | 2/1982 | Macleod et al. | 425/467 |
| 4,663,107 | 5/1987 | Takada et al. | 425/326.1 |
| 4,721,594 | 1/1988 | Jarvenkyla | 425/326.1 |
| 4,867,928 | 9/1989 | Jarvenkyla et al. | 264/508 |
| 4,876,051 | 10/1989 | Campbell et al. | 425/380 |
| 4,900,503 | 2/1990 | Hegler et al. | 425/133.1 |
| 4,983,347 | 1/1991 | Rahn | 425/393 |
| 5,023,029 | 6/1991 | Lupke | 425/326.1 |
| 5,139,730 | 8/1992 | Holso et al. | 425/336 |

FOREIGN PATENT DOCUMENTS 0315012 5/1989 European Pat. Off. .
70822 7/1986 Finland .
398615 1/1978 Sweden .
8704113 7/1987 World Int. Prop. O. .

Primary Examiner—Jay H. Woo
Assistant Examiner—Joseph Leyson
Attorney, Agent, or Firm—Ladas & Parry

[57] ABSTRACT

An apparatus for manufacturing from a mouldable material a pipe having ribs on its outer surface and a smooth inner surface has a core including a shaft, a conically widening mandrel located downstream of the shaft in a direction of production and a kernel having an initial zone and an end zone respectively of substantially uniform diameters successively disposed downstream of the mandrel. An extrusion sleeve surrounds the core and forms with the core a nozzle for the material. The extrusion sleeve has a first end face located upstream of the kernel. Moulds encase the extrusion sleeve and the core, the moulds being movable along endless paths and having grooves on inner surfaces for forming the ribs on the pipe. A heater heats the initial zone of the kernel, the initial zone of the kernel being cylindrical. A first cooler cools the end zone of the kernel. A second end face of an upstream outset of the end zone of the kernel conically widens in the direction of production from a smallest diameter substantially corresponding to the diameter of the initial zone to a largest diameter.

18 Claims, 1 Drawing Sheet

APPARATUS FOR MANUFACTURING RIBBED PIPES

BACKGROUND OF THE INVENTION

This invention relates to an apparatus for manufacturing ribbed pipes with a smooth inner surface from a mouldable material, said apparatus comprising a core including a shaft, a conically widening mandrel located downstream of the shaft seen from the direction of production of the apparatus, and a kernel of a substantially uniform diameter disposed after the mandrel, an extrusion sleeve surrounding the core and forming with the core a nozzle for the material, the extrusion sleeve having an end face located upstream of the kernel seen in the direction of production of the apparatus, and moulds encasing the extrusion sleeve and the core and being movable along an endless path, having grooves on the inner surface for forming ribs on the pipe, whereby an initial zone of the kernel which is in the vicinity of the nozzle has means for heating this zone and an end zone of the kernel which is remote from the nozzle has means for cooling this zone.

The production of closed-wall ribbed pipes having prominent and narrow ribs and a smooth inner surface has proved unexpectedly difficult. Prominent and narrow ribs would be the most advantageous in view of the use of the pipe. In order for the deep and narrow grooves in the inner surface of the moulds to be filled, high pressures must be used which place severe requirements on the endurance of the apparatus. These problems are aggravated when a stiff plastic, such as unsoftened PVC, is used.

Another important problem relates to the quality of the inner surface of the pipe. The smoothness of the inner surface is impaired e.g. by the following factors: air bubbles generated in the forming space, melt tears resulting from a high shearing rate, irregularities and cold seams resulting from the laminar structure of the material, the adhesion of the inner surface to the kernel, and depressions and air bubbles in the material resulting from the uneven cooling of the mass.

The publication WO 87/04113 discloses an apparatus wherewith it is possible to manufacture ribbed pipes of a relatively high quality. In this known apparatus the kernel is divided into two zones whereof an initial zone located closest to the nozzle is heated and an end zone located after it is cooled.

The reference discloses that the diameter of the initial zone of the kernel increases slightly in the direction of movement of the material. By heating the pipe in the region of the kernel and simultaneously forcing the material toward the moulds, the material is caused to fill the grooves in the moulds simultaneously as the inner surface of the pipe is made fully smooth. This effect can probably be explained by the fact that after the extrusion pressure has filled the grooves in the moulds in the region of the conical mandrel, the material begins to cool by the action of the moulds and thereby also to shrink. Imperfections due to different cooling rates and shrinkage of the material are prevented by generating a considerable afterpressure in the grooves of the moulds, on account of which the material to be formed closely follows the surfaces of the moulds and the kernel. This afterpressure is independent of the extrusion pressure and can therefore be easily regulated by varying the heating effect.

However, in practice it has been found that the inner surface of pipes manufactured by this known apparatus is not always smooth but contains irregularities.

SUMMARY OF THE INVENTION

The object of this invention is to provide apparatus for manufacturing ribbed pipes, wherewith plastic pipes having a fully smooth inner surface can be produced. The apparatus of the invention is characterized in that the surface of the initial zone of the kernel is cylindrical and that the outset of the end zone of the kernel has an end face conically widening in the direction of production of the apparatus the smallest diameter of said end face substantially corresponding to the diameter of the initial zone.

The invention is based on the realization that the uneven inner surface of the pipe is a result from the fact that the plastic material adheres to the heated and widening initial zone of the kernel, whereby shearing stresses are generated in the inner wall of the pipe which will make the surface uneven and which may produce cracks. Therefore, in accordance with the invention the heated initial zone of the kernel is cylindrical and not widening, whereby the plastic material will not adhere thereto and whereby no shearing stresses are generated. The afterpressure which is essentially important from the point of view of the smoothness of the inner surface of the pipe is generated by means of a conically widening end face disposed at the outset of the end zone. Since the end face is part of the cooled end zone, the plastic material will not adhere to wherefore no stresses are generated on the inner surface of the pipe.

As used in this specification, the kernel is the portion of the core that has a substantially uniform diameter for calibrating the inner surface of the pipe. Therefore, it is evident that its diameter cannot vary very much. In known devices, the kernel has a uniform diameter or the diameter diminishes slightly towards the end, in order for the cooling and thereby contracting pipe not to adhere to the kernel. Thus it is preferred in the present invention that the difference between the smallest and largest diameter of the end face is 0.1% to 0.5%, preferably about 0.25%, of the diameter of the kernel. The difference between the diameters is prefer ably about 0.5 mm when the diameter of the kernel is 200 mm.

The end face shall be rather steep in order for the inner surface of the pipe not to have time to become too stiff prior to the smoothing thereof with the end face. The angle between the end face and the central line of the core is thereby e.g. 2° to 45°, preferably about 20°.

In devices for manufacturing plastic pipes, the largest diameter of the kernel has to be slightly greater than the desired inner diameter of the pipe to be produced, since the pipe shrinks upon cooling at the kernel and thereafter. The difference between the largest diameter of the kernel and the inner diameter of the produced pipe can be calculated by means of the formulae for heat expansion used in the art. In accordance with the invention, it has been unexpectedly found that by providing a cold end face according to the invention in the kernel, it is possible to make the largest diameter of the kernel——which is simultaneously the largest diameter of the end face——larger than it should be according to the formulae used in the art. In other words, when the pipe is widened by means of the cold end face according to the invention, it will shrink after the end face more than could be expected according to the formulae. This results in that the inner surface of the pipe can be compressed more than expected, on account of which the inner surface of the produced pipe is smoother than the inner surface of pipes manufactured by prior apparatus.

BRIEF DESCRIPTION OF THE DRAWING

One advantageous embodiment of the invention is explained more closely in the following with reference to the accompanying drawing, wherein.

DESCRIPTION OF THE PREFERRED EMBODIMENT

Figure 1:
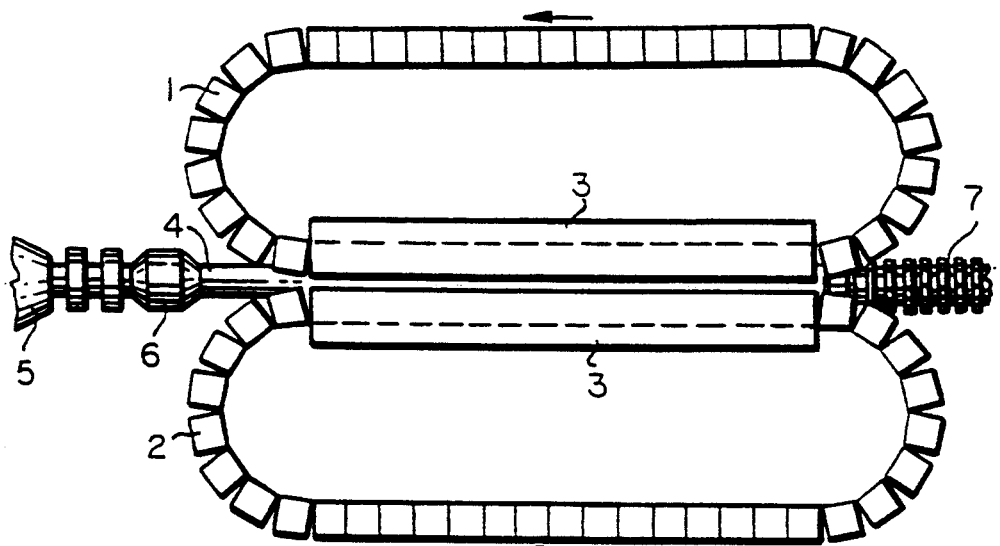
FIG. 1 shows a schematic view of the apparatus for manufacturing a ribbed pipe and FIG. 2 shows a detail of the apparatus on a larger scale in a longitudinal section.

The apparatus disclosed in FIG. 1 comprises two moulds 1 and 2 moving along an endless path, which meet one another at guide rails 3 to form a cylindrical form. An extrusion sleeve 4 being in communication with the press end 6 of an extruder 5 extends into said form. FIG. 1 also shows how produced pipe 7 protrudes from one end of the form constituted by the moulds.

Figure 2:
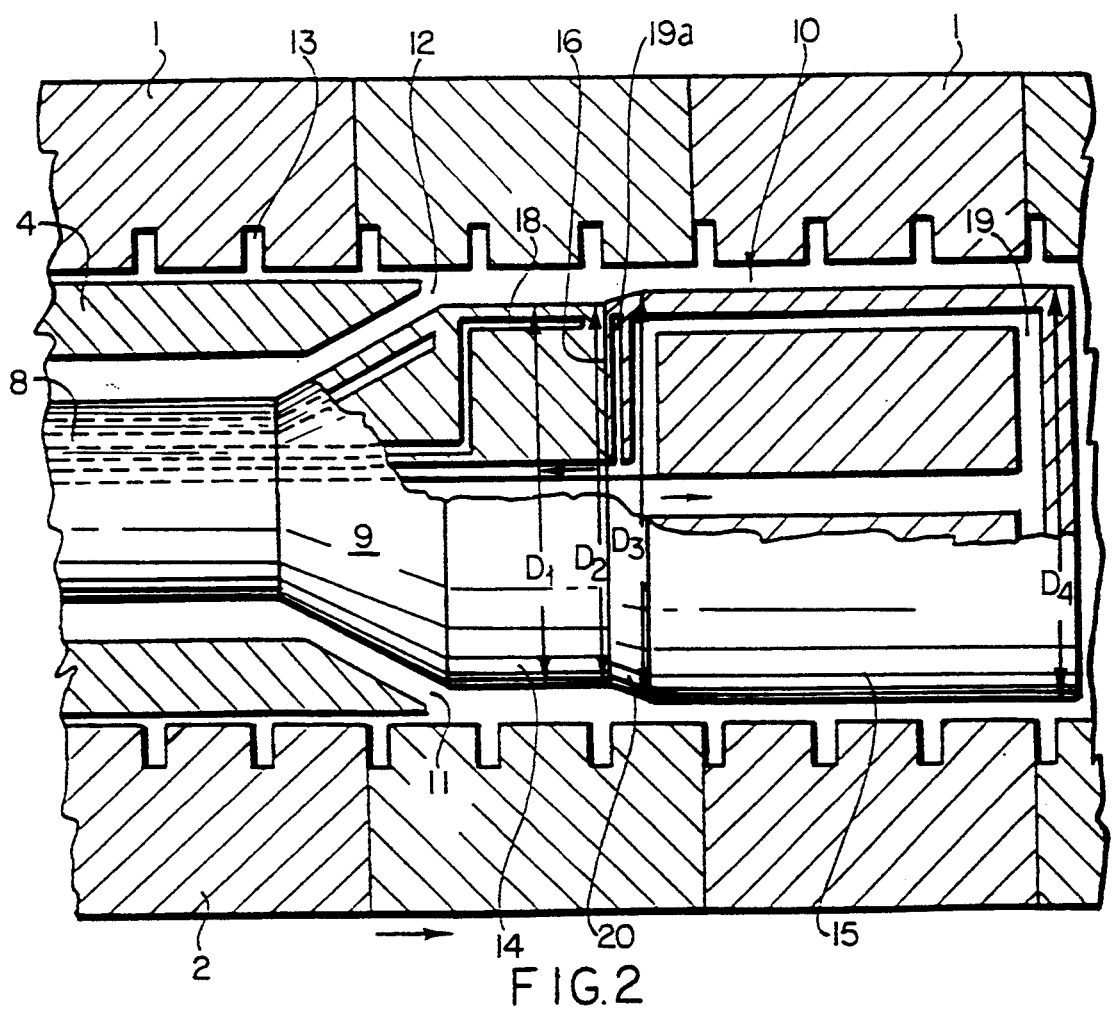

FIG. 2 presents more closely those parts of the apparatus which take part in the forming of the pipe. On the central line of the apparatus, there is a shaft 8 within the extrusion sleeve 4, said shaft having a constant diameter. Downstream of the shaft there is a conically widening mandrel 9 which is located, at least for the most part, within the extrusion sleeve and after which a kernel 10 having a substantially constant diameter is provided. The shaft 8, the mandrel 9 and the kernel 10 together form the core of the apparatus. The extrusion sleeve 4 has an end face located upstream of the kernel 10 seen in the direction of production of the device. In the embodiment shown, the end face is located at the mandrel.

The extrusion sleeve 4 and the mandrel 9 form between them an annular nozzle 11 wherethrough the material to be moulded, e.g. plastic material, is fed into the moulding space 12 between the moulds 1, 2 and the kernel 10. To produce a pipe having ribs on the outer surface thereof, the inner surface of the moulds has annular grooves 13 at a distance from one another, whereinto the plastic material is pressed to form ribs.

The kernel 10 comprises two parts in succession, i.e. an initial zone 14 and an end zone 15. The zones are closely connected, and the transition surface between them has been indicated by the reference numeral 16. The mandrel 9 and the initial zone 14 of the kernel have heating means 18 schematically shown in the drawing, e.g. for a liquid heating medium, and the end face 29 and end zone 15 of the kernel have separate ducts 19a and 19 for a cooling medium. The moulds 1, 2 are conventionally cooled.

In accordance with the invention, the surface of the initial zone 14 of the kernel 10 is cylindrical, i.e. it has a constant diameter $D_1$, and the outset of the end zone 15 of the kernel has an end face 20 conically widening in the direction of production of the apparatus. The smallest diameter $D_2$ of the end face equals the diameter of the initial zone $D_1$, the largest diameter $D_s$ of the end face being slightly greater than $D_2$. For clarity, the difference between the diameters $D_2$ and $D_3$ has been exaggerated in FIG. 2. In practice, the difference between these diameters is 0.1% to 0.5%, preferably about 0.25%, of the diameter of the kernel. The angle between the end face 20 and the central line of the core is 2° to 45°, preferably about 20°. The diameter $D_4$ of the rear end of the kernel may be the same as $D_3$ or slightly smaller. The length of the end zone of the kernel is about 50% of the entire length of the kernel and is 200 to 1000 mm.

According to a preferred embodiment of the invention, the largest diameter $D_3$ of the end face is larger than the calculated largest permissible diameter of the core at pipe forming temperature. The diameter $D_4$ of the rear end of the core substantially corresponds to said calculated diameter at pipe outlet temperature.

Under a high pressure, PVC material is a very erosive substance. It was found in tests carried out that if the outset of the end zone of the kernel was not well cooled, strong abrasion took place in the outset. In one embodiment of the invention, said outset is very effectively cooled on a distance of about 50 mm by means of a separate cooling spiral, and coated with hard chromium, nickel or an equivalent coating material having a hard wear surface. The remaining material of the mandrel is preferably stainless steel.

The apparatus shown in the drawing operates in the following manner. Pressurized material to be moulded, such as plastic material, is fed through the nozzle 11 between the extrusion sleeve 4 and the mandrel 9 into the moulding space 12 so that it fills up the grooves 13 in the moulds as well as the space between the moulds and the core of the apparatus. The material pressed into the grooves 13 will form the ribs on the pipe, and the material remaining between the moulds and the core will form the wall of the pipe.

As the material meets the moulds 1, 2, it begins to cool, but since the initial zone 14 of the kernel is heated with means 18, the parts of the material which are closest to the kernel remain in a plastic state.

After the material has passed the transition surface 16 between the zones 14, 15, it encounters the effectively cooled and relatively steeply widening end face 20 which presses the material still slightly outward. This will increase the afterpressure or terminal pressure in the material and compact and smooth the inner surface of the pipe. The pipe will thereafter advance along the cylindrical or decreasing-diameter surface of the end zone 15 simultaneously as a cooling effect is applied thereto through the moulds and the kernel.

In the embodiment presented above, the initial zone and end zone of the kernel are separate material units which are Joined with one another along a plane 16 wherein the smallest diameter of the end face 20 lies. The end face 20 may alternatively be located at a short distance from the surface 16.

We claim:

1. In an apparatus for manufacturing from a mouldable material a pipe having ribs on its outer surface and a smooth inner surface, the apparatus comprising: a core including a shaft (8), a conically widening mandrel (9) located downstream of the shaft in a direction of production and a kernel (10) having an initial zone (14) and an end zone (15) respectively of substantially uniform diameters successively disposed downstream of the mandrel; an extrusion sleeve (4) surrounding the core and forming with the core a nozzle (11) for the material, the extrusion sleeve having a first end face located upstream of the kernel (10); and moulds (1, 2) encasing the extrusion sleeve and the core, the moulds being movable along endless paths and having grooves (13) on inner surfaces for forming the ribs on the pipe (7), the improvements further comprising:

heating means (18) for heating the initial zone of the kernel, the initial zone of the kernel being cylindrical;

first cooling means (19) for cooling the end zone of the kernel; and a second end face (20) of an upstream outset of the end zone of the kernel, the second end face conically widening in the direction of production from a smallest widening in the direction of production from the smallest diameter substantially corresponding to the diameter of the initial zone to a largest diameter.

2. The apparatus as claimed in claim 1, wherein a difference between the smallest and largest diameters of the second end face is from 0.1% to 0.5% of any of the diameters of the kernel.

3. The apparatus as claimed in claim 1, wherein an angle between the second end face and a central line of the core is from 2° to 45°.

4. The apparatus as claimed in claim 1, wherein the initial and end zones of the kernel abut each other.

5. The apparatus as claimed in claim 1, wherein the outset has a layer increasing its hardness.

6. The apparatus as claimed in claim 5, wherein the outset of the end zone has second cooling means that are separate from the first cooling means.

7. The apparatus as claimed in claim 1, wherein a length of the end zone (15) of the kernel in the direction of production is about 50% of a total length of the kernel in the direction and is 200 to 1000 mm.

8. The apparatus as claimed in claim 2, wherein the difference is about 0.25%.

9. The apparatus as claimed in claim 3, wherein the angle is about 20°.

10. The apparatus as claimed in claim 5, wherein the layer comprises chromium.

11. The apparatus as claimed in claim 2, wherein an angle between the second end face and a central line of the core is from 20° to 45°.

12. The apparatus as claimed in claim 11, wherein the initial and end zones of the kernel abut each other.

13. The apparatus as claimed in claim 12, wherein the outset has a layer increasing its hardness.

14. The apparatus as claimed in claim 13, wherein the outset of the end zone has second cooling means that are separate from the first cooling means.

15. The apparatus as claimed in claim 14, wherein a length of the end zone (15) of the kernel in the direction of production is about 50% of a total length of the kernel in the direction and is 200 to 1000 mm.

16. The apparatus as claimed in claim 15, wherein the difference is about 0.25%.

17. The apparatus as claimed in claim 16, wherein the angle is about 20°.

18. The apparatus as claimed in claim 17, wherein the layer comprises chromium.

* * * * *